July 6, 1926.
H. F. GEPHART
FISHING ROD AND REEL LOCK
Filed August 17, 1925
1,591,122
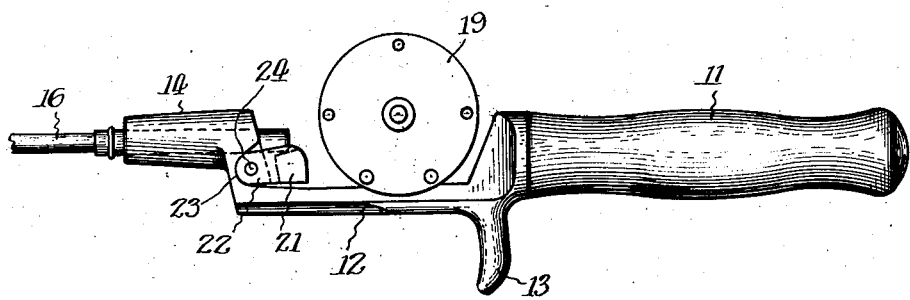
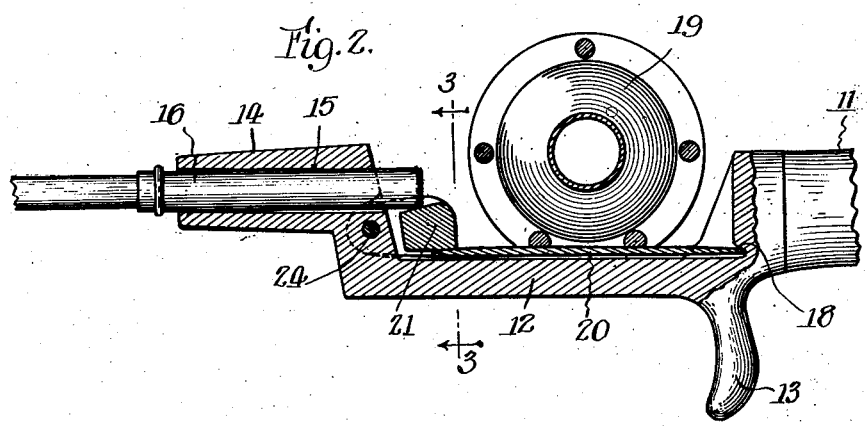
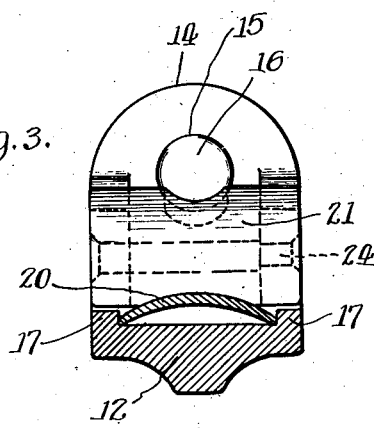
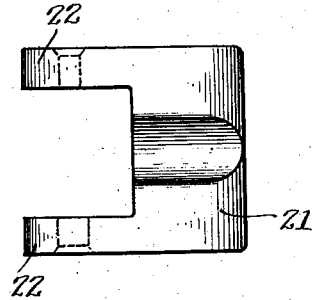
Witness:
T. J. Sauser.
Inventor:
Harry F. Gephart
By Walter M. Fuller
Attys.

Patented July 6, 1926.

1,591,122

UNITED STATES PATENT OFFICE.

HARRY F. GEPHART, OF CHICAGO, ILLINOIS.

FISHING ROD AND REEL LOCK.

Application filed August 17, 1925. Serial No. 50,592.

My invention pertains to novel and advantageous means for locking or fastening together the separable parts of fishing-rods and similar structures, its particular aim, in the present instance, being the provision of such means for demountably securing together, the rod, handle-member and reel in such a way that they are very firmly held or bound together but with capacity for readily effecting their dissociation when required.

One purpose or object of the invention is the provision of such a structure which comprises few parts, which is effective in action, and which can be produced at relatively small cost.

To enable those skilled in this art to have a complete understanding of the invention and its several structural and functional benefits and advantages, in the associated drawing, forming a part of this specification and throughout the several views of which like reference numerals have been employed to designate the same parts, a desirable and preferred embodiment thereof has been fully presented.

In this drawing:

Figure 1 is a fragmentary side elevation of a fishing rod supplied with the new structural features;

Figure 2 is a longitudinal section of the same on an enlarged scale;

Figure 3 is a cross-section on line 3—3 of Figure 2 on a still larger scale and

Figure 4 is a plan view of the pivoted lock, showing the same detached from the other associated parts of the appliance.

Referring to these several views of the drawing, it will be perceived that the novel and improved fishing-rod includes a so-called "drop" handle-member comprising a handle proper 11 adapted to be grasped by the fisherman, a depressed, intermediate section 12 equipped with a depending finger piece 13, and a forward elevated socket member 14 apertured lengthwise at 15 for the reception of the end or ferrule portion of the steel rod 16.

It should be observed that the middle part of this handle-member on its top lowered surface has upstanding, shallow, marginal, retaining flanges 17, 17 between which the element has a cross groove or recess 18, as is clearly shown in Figure 2.

When the reel 19 is mounted on the handle-member, its transversely-arched base 20 fits between the spaced flanges 17, 17 and its rear end is accommodated in the groove or cavity 18, the latter being preferably slightly tapered as shown for the accomplishment of a neat and snug fit.

A wedge lock-member 21 has spaced lugs or ears 22, 22 accommodated in cavities 23 in the opposite sides of the socket portion 14 of the handle-member and these are hinged thereto at 24 in any approved or convenient manner.

As is clearly depicted, the under face of the lock-member is designed and adapted to bear or press down on the top surface of the forward part of the reel base and hold it fixedly and securely in proper position with its other or opposite end confined in the groove 18.

The top face of the lock-member has an upwardly sloping rounded groove for the reception of the rear end of the rod 16 protruding through the socket aperture 15.

Such end of the rod cooperates with the hinged wedge or locking member to force it down firmly into binding and clamping engagement or contact with the reel base, the rod in performing this desirable function becoming itself firmly locked in place by frictionally bearing on the inner wall of the socket and the hinged locking element, whereby the latter acts to securely retain both members, the reel and the rod, on the handle element.

So long as the rod remains properly associated with or fitted in the handle socket it locks the reel in place.

Obviously, to remove or demount the reel, it is merely necessary to pull out the rod, thus releasing the lock, whereupon the reel can be easily lifted off, the locking-member swinging upwardly to permit such demounting.

A construction of this character can be used effectively with rods and reels of somewhat different dimensions or forms, because the hinged mounting of the locking-member and its wedge engagement with the end of the rod permits an appreciable tolerance or play of parts to obtain a proper adjustment for and fastening of the several shapes and sizes of rods and reels now on the market.

Those trained and skilled in this art will readily understand that the invention, as defined by the appended claims, is not limited or restricted to the exact and precise mechanical details illustrated and described because these may be modified within comparatively wide limits without departure from the heart and essence of the invention and without the sacrifice of any of its material benefits and advantages.

I claim:

1. A fishing-rod handle-member having in combination a handle proper, an intermediate section adapted to receive a reel and a forward socket designed to receive the rear end of a fishing rod and a single locking means on said handle-member to retain said reel and rod thereon.

2. A fishing-rod handle-member having in combination a handle proper, an intermediate section adapted to receive a reel and a forward socket designed to receive the rear end of a fishing rod and hinged locking means on said handle-member to retain said reel and rod thereon.

3. A fishing-rod handle-member having in combination a handle proper, an intermediate section adapted to receive a reel and a forward socket designed to receive the rear end of a fishing-rod and a lock adapted by engagement with the part of the rod protruding from said socket to fasten the reel on the handle-member.

4. A fishing-rod handle-member having in combination a handle proper, a depressed intermediate section adapted to receive a reel and a forward socket designed to receive the rear end of a fishing-rod with the latter protruding rearwardly from said socket, a hinged wedge lock on said handle-member adapted to bear on the upper face of the base of the reel and on the under face of the projecting end of the rod.

5. A fishing-rod handle-member having in combination a handle proper, a depressed intermediate section equipped with marginal flanges and an adjacent cross groove and a forward socket designed to receive the rear end of a fishing-rod with the latter projecting rearwardly from such socket, said intermediate section adapted to accommodate a reel with its base between said flanges and received in part in said groove, and a wedge lock hinged to said handle-member in a position to be held in engagement with said reel base by the bearing of the protruding end of the rod on the lock.

In witness whereof I have hereunto set my hand and seal.

H. F. GEPHART. [L. S.]